(12) United States Patent
Takizawa et al.

(10) Patent No.: US 11,411,445 B2
(45) Date of Patent: Aug. 9, 2022

(54) PERMANENT-MAGNET SYNCHRONOUS MOTOR AND ELECTRIC POWER STEERING DEVICE

(71) Applicant: Mitsubishi Electric Corporation, Tokyo (JP)

(72) Inventors: Yuji Takizawa, Tokyo (JP); Hiroko Ikeda, Tokyo (JP); Kazumasa Ito, Tokyo (JP); Shinichi Yamaguchi, Tokyo (JP); Yu Hirotani, Tokyo (JP); Satoru Akutsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 103 days.

(21) Appl. No.: 16/617,022

(22) PCT Filed: Sep. 7, 2017

(86) PCT No.: PCT/JP2017/032190
§ 371 (c)(1),
(2) Date: Nov. 26, 2019

(87) PCT Pub. No.: WO2019/049249
PCT Pub. Date: Mar. 14, 2019

(65) Prior Publication Data
US 2021/0135513 A1    May 6, 2021

(51) Int. Cl.
*H02K 1/16*        (2006.01)
*H02K 11/215*    (2016.01)
(Continued)

(52) U.S. Cl.
CPC ............... *H02K 1/16* (2013.01); *H02K 3/28* (2013.01); *H02K 11/215* (2016.01); *H02K 21/24* (2013.01)

(58) Field of Classification Search
CPC .......... H02K 1/16; H02K 11/215; H02K 3/28; H02K 21/24; H02P 29/028; H02P 29/032; H02P 25/22; H02P 5/46
(Continued)

(56) References Cited

U.S. PATENT DOCUMENTS 4,626,725 A * 12/1986 Kawada ................... H02K 5/15
310/89
10,322,748 B2 * 6/2019 Yanagi ................... B62D 5/003
(Continued)

FOREIGN PATENT DOCUMENTS

DE    10 2007 029 157 A1    1/2009
JP    2010-531130 A    9/2010
(Continued)

OTHER PUBLICATIONS

Examination Report dated Jul. 24, 2020, from the Intellectual Property Office of India in Application No. 201927045575.
(Continued)

*Primary Examiner* — John K Kim
(74) *Attorney, Agent, or Firm* — Sughrue Mion, PLLC; Richard C. Turner (57) ABSTRACT

A permanent-magnet synchronous motor and an electric power steering device are driven by a first system including a first armature winding and a first control apparatus and by a second system including a second armature winding and a second control apparatus and are configured in such a way that if one system fails, driving by the one system is stopped but the driving is continued by the other system.

17 Claims, 7 Drawing Sheets

(51) Int. Cl.
*H02K 3/28* (2006.01)
*H02K 21/24* (2006.01)

(58) Field of Classification Search
USPC .......................................................... 310/152
See application file for complete search history.

(56) References Cited

U.S. PATENT DOCUMENTS

| | | | | |
|---|---|---|---|---|
| 2003/0057781 | A1* | 3/2003 | Shukuri | ............... F04D 23/008 |
| | | | | 310/68 B |
| 2004/0061409 | A1* | 4/2004 | Grant | ................... H02K 15/024 |
| | | | | 310/216.057 |
| 2006/0219470 | A1* | 10/2006 | Imagawa | ............... H02P 6/005 |
| | | | | 180/446 |
| 2006/0237567 | A1* | 10/2006 | Castelli | ............... D03D 47/361 |
| | | | | 242/365.1 |
| 2010/0289370 | A1 | 11/2010 | Roth et al. | |
| 2013/0241452 | A1* | 9/2013 | Suzuki | ................... B62D 5/046 |
| | | | | 318/400.15 |
| 2016/0006387 | A1* | 1/2016 | Nakamura | ........... B62D 5/0463 |
| | | | | 701/43 |
| 2017/0237377 | A1 | 8/2017 | Furukawa et al. | |
| 2021/0135513 | A1* | 5/2021 | Takizawa | ............... H02K 21/24 |

FOREIGN PATENT DOCUMENTS

| | | |
|---|---|---|
| JP | 2016-19330 A | 2/2016 |
| WO | 2016/135840 A1 | 9/2016 |

OTHER PUBLICATIONS

International Search Report for PCT/JP2017/032190 dated, Dec. 12, 2017 (PCT/ISA/210).
European Search Report dated Aug. 25, 2020 from the European Patent Office in EP Application No. 17924115.3.
Communication dated Feb. 24, 2021 by the Japanese Patent Office in application No. 2019-540190.
Communication dated Aug. 31, 2021, from the Japanese Patent Office in application No. 2019-540190.

* cited by examiner

PERMANENT-MAGNET SYNCHRONOUS MOTOR AND ELECTRIC POWER STEERING DEVICE

CROSS REFERENCE TO RELATED APPLICATIONS

This application is a National Stage of International Application No. PCT/JP2017/032190 filed Sep. 7, 2017.

TECHNICAL FIELD

The present invention relates to a permanent-magnet synchronous motor having magnetic-field poles composed of a permanent magnet and to an electric power steering device in which the permanent-magnet synchronous motor is utilized as a driving source.

BACKGROUND ART

As is well known, an electric power steering device plays a role of assisting steering torque for a driver of a vehicle such as an automobile to operate the steering wheel, by means of auxiliary torque produced, for example, by a driving-apparatus-integrated permanent-magnet synchronous motor that is integrated with a driving apparatus. In recent years, in an automobile automatic driving system, an electric power steering device plays a role of an actuator for automatically avoiding an obstacle on a road, detected by a vehicle camera, a vehicle radar, or the like, without involving the driver in the operation of steering. Thus, in such an electric power steering device, it is important that neither auxiliary torque for assisting the operation of the steering wheel nor torque required for avoiding an obstacle at a time when automatic driving is implemented is suddenly lost.

For example, in the case where in a permanent-magnet synchronous motor provided as a driving source for an electric power steering device, an armature winding provided in a stator fails due to short-circuiting, magnetic flux from a permanent magnet provided in a rotor rotates due to rotation of the rotor and hence is interlinked with the armature winding provided in the stator, which may cause a large short circuit current to flow through a low-impedance short circuit in the armature winding. In this case, as so-called reaction magnetic flux, the magnetic flux generated by the short circuit current produces braking torque that impedes rotation of the permanent-magnet synchronous motor, which may cause a malfunction in the operation of the electric power steering device.

In the case where in order to avoid the foregoing malfunction, the armature winding of the permanent-magnet synchronous motor is composed of two sets of armature windings that are electrically independent from each other, it is made possible that if one of the two groups of armature windings fails, energization of the failed one thereof is stopped and the other one thereof, which is normal, produces required torque.

For example, a permanent-magnet synchronous motor disclosed in Patent Document 1 is configured in the following manner: a stator winding is wound on alternate teeth among a great number of teeth in a stator iron core and the stator winding includes two sets of independent three-phase armature windings that are star-connected or delta-connected; because even if a short-circuit failure or the like occurs in one of the three-phase armature windings, the other one thereof is normal, it is made possible that the foregoing braking torque is reduced so that the reliability of the synchronous motor is raised.

PRIOR ART REFERENCE

Patent Document

[Patent Document 1] National Publication of International Patent Application No. 2010-531130

DISCLOSURE OF THE INVENTION

Problems to be Solved by the Invention

However, reaction magnetic flux generated by a short circuit current that flows due to a short-circuit failure in the one of armature windings is interlinked also with the other armature winding, which is normal, other than the short circuit in the one of the armature windings, in which the short-circuit failure has occurred; therefore, the reaction magnetic flux provides an effect to the driving voltage of the motor driving device connected with the normal armature winding and hence intended motor control becomes difficult. The reason therefor is that because the two sets of armature windings are wound on one and the same stator iron core, the magnetic path is shared by the two armature windings and hence the two armature windings are magnetically and tightly coupled with each other through a mutual inductance.

Therefore, it is an important theme that a permanent-magnet synchronous motor having two sets of armature windings and being utilized in an electric power steering device is configured in such away that the two sets of armature windings are not only electrically independent from each other but also not magnetically coupled with each other so that if one of the armature windings fails, steering operation is continued by means of the other one thereof, which is normal.

The present invention has been implemented in order to solve the foregoing problems in a permanent-magnet synchronous motor provided with two sets of armature windings; one objective thereof is to provide a permanent-magnet synchronous motor in which even if a system including one of the two sets of armature windings fails, desired torque can be obtained through a system including the other one of the two sets of armature windings.

In addition, another objective of the present invention is to provide an electric power steering device in which even if a system including one of the two sets of armature windings of a permanent-magnet motor as a driving source fails, desired torque can be obtained through a system including the other one of the two sets of armature windings.

Means for Solving the Problems

A permanent-magnet synchronous motor according to the present invention includes
a stator iron core having a plurality of teeth in an inner circumferential portion thereof and a space surrounded by the inner circumferential portion,
an armature winding wound on every two teeth among the plurality of teeth, and
a rotor that is inserted into the space of the stator iron core and has magnetic-field poles that are each composed of a permanent magnet; the permanent-magnet synchronous motor is characterized in that the armature winding is separated into a first armature winding and a second armature winding that are independent from each other, in that the first armature winding is connected with a first control apparatus, in that the second armature winding is connected with a second control apparatus, in that driving can be performed by a first system including the first armature winding and the first control apparatus and a second system including the second armature winding and the second control apparatus, and in that if a failure occurs in one of the first system and the second system, the driving by the one thereof is stopped and the driving is continued by the other one thereof.

An electric power steering device according to the present invention is provided with a permanent-magnet synchronous motor that includes a stator iron core having a plurality of teeth in an inner circumferential portion thereof and a space surrounded by the inner circumferential portion, an armature winding wound on every two teeth among the plurality of teeth, and a rotor that is inserted into the space of the stator iron core and has magnetic-field poles that are each composed of a permanent magnet; the permanent-magnet synchronous motor is characterized in that the armature winding is separated into a first armature winding and a second armature winding that are independent from each other, in that the first armature winding is connected with a first control apparatus, in that the second armature winding is connected with a second control apparatus, in that driving can be performed by a first system including the first armature winding and the first control apparatus and a second system including the second armature winding and the second control apparatus, and in that if a failure occurs in one of the first system and the second system, the driving by the one thereof is stopped and the driving is continued by the other one thereof; in the electric power steering device, torque produced by the permanent-magnet synchronous motor is involved in steering of a vehicle.

Advantage of the Invention

A permanent-magnet synchronous motor according to the present invention includes a stator iron core having a plurality of teeth in an inner circumferential portion thereof and a space surrounded by the inner circumferential portion, an armature winding wound on every two teeth among the plurality of teeth, and a rotor that is inserted into the space of the stator iron core and has magnetic-field poles that are each composed of a permanent magnet; the permanent-magnet synchronous motor is characterized in that the armature winding is separated into a first armature winding and a second armature winding that are independent from each other, in that the first armature winding is connected with a first control apparatus, in that the second armature winding is connected with a second control apparatus, in that driving can be performed by a first system including the first armature winding and the first control apparatus and a second system including the second armature winding and the second control apparatus, and in that if a failure occurs in one of the first system and the second system, the driving by the one thereof is stopped and the driving is continued by the other one thereof. As a result, there can be obtained a permanent-magnet synchronous motor in which even if a failure occurs in one of the two systems, desired torque can be obtained by the other one thereof.

An electric power steering device according to the present invention is provided with a permanent-magnet synchronous motor that includes a stator iron core having a plurality of teeth in an inner circumferential portion thereof and a space surrounded by the inner circumferential portion, an armature winding wound on every two teeth among the plurality of teeth, and a rotor that is inserted into the space of the stator iron core and has magnetic-field poles that are each composed of a permanent magnet; the permanent-magnet synchronous motor is characterized in that the armature winding is separated into a first armature winding and a second armature winding that are independent from each other, in that the first armature winding is connected with a first control apparatus, in that the second armature winding is connected with a second control apparatus, in that driving can be performed by a first system including the first armature winding and the first control apparatus and a second system including the second armature winding and the second control apparatus, and in that if a failure occurs in one of the first system and the second system, the driving by the one thereof is stopped and the driving is continued by the other one thereof. In the electric power steering device, torque produced by the permanent-magnet synchronous motor is involved in steering of a vehicle; therefore, there can be obtained an electric power steering device in which even if a failure occurs in one of the two systems, desired torque can be obtained by the other one thereof and hence steering of a vehicle can smoothly be continued.

BEST MODE FOR CARRYING OUT THE INVENTION

Embodiment 1

Figure 1:
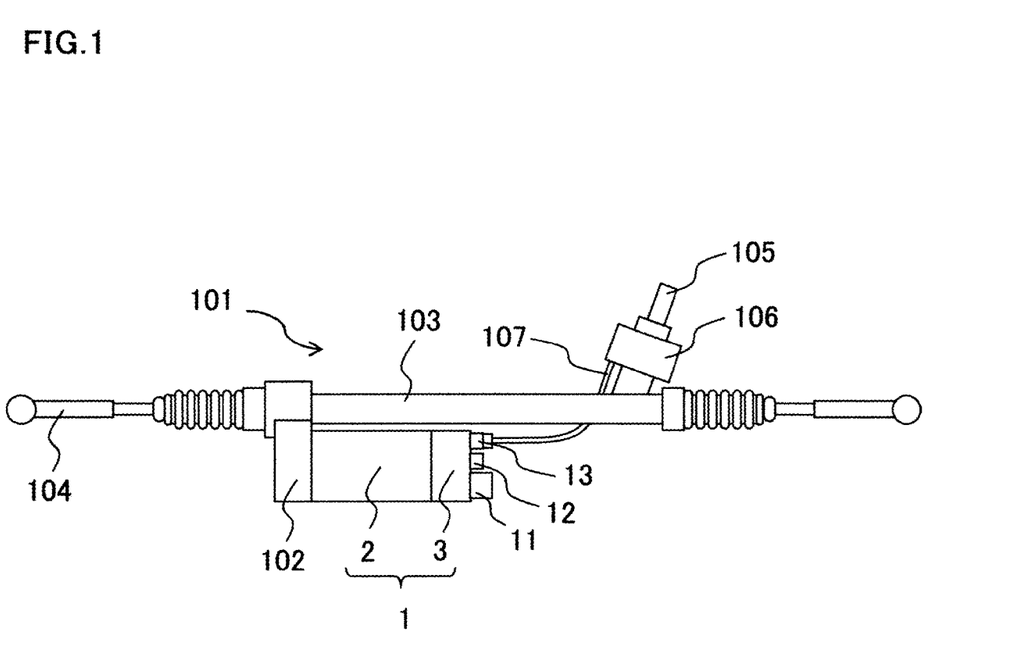
FIG. 1 is a configuration diagram of an electric power steering device according to Embodiment 1 of the present invention.

FIG. 1 is a configuration diagram of an electric power steering device according to Embodiment 1 of the present invention. In FIG. 1, when a driver operates a steering wheel (unillustrated), steering power produced through steering by the driver is transferred to a shaft 105 of an electric power steering device 101 through the intermediary of a steering shaft (unillustrated). The steering torque transferred to the shaft 105 is detected and transformed into an electric signal by a torque sensor 106; then, through a cable 107, the electric signal is inputted to a control apparatus 3 by way of a torque sensor signal connector 13 of a driving-apparatus-integrated permanent-magnet synchronous motor 1. In the driving-apparatus-integrated permanent-magnet synchronous motor 1, a motor unit 2, the control apparatus 3 provided with a driving apparatus and the like in such a manner as described later, and a gearbox 102 with a built-in speed reducing mechanism are integrally fixed with one another. The details of the driving-apparatus-integrated permanent-magnet synchronous motor 1 will be explained later.

Information items such as a vehicle speed and the like in a vehicle network (unillustrated) are inputted to the control apparatus 3 by way of a vehicle signal connector 12; furthermore, electric power from a vehicle power source (unillustrated) such as a battery is inputted to the control apparatus 3 by way of a power source connecter 11. Based on the inputted driver's steering torque and information items such as a vehicle speed, the control apparatus 3 in the driving-apparatus-integrated permanent-magnet synchronous motor 1 calculates torque to be outputted by the motor unit 2; then, by way of the driving apparatus, including an after-mentioned inverter, that is provided in the control apparatus 3, the control apparatus 3 supplies an electric current to an armature winding of the motor unit 2.

The rotation shaft, as the output axle, of the driving-apparatus-integrated permanent-magnet synchronous motor 1 is mounted in such a way that the axial direction thereof is in parallel with the axial direction of a housing 103 of the electric power steering device 101. Output torque of the driving-apparatus-integrated permanent-magnet synchronous motor 1 is decelerated through the intermediary of the gearbox 102 incorporating a belt and a ball screw and is transformed into thrust for making a rack axel in the housing 103 perform a translational motion; then, the thrust assists the driver's steering power inputted to the electric power steering device 101 by way of the shaft 105. The thrust produced by the translational motion of the rack axel makes a tie rod 104 travel in the axial direction thereof, so that the front wheels (unillustrated), which are the steering wheels of the vehicle, are steered.

The electric power steering device 101 makes it possible that with small steering power, the driver obtains large steering power for steering the front wheels on which the weight of the vehicle itself is imposed; thus, the vehicle can smoothly be turned from side to side.

In the case where an obstacle detected by a vehicle camera, a vehicle radar, or the like is avoided and in the case where a traveling lane is maintained or changed, the electric power steering device 101 in an automatic driving vehicle operates as an actuator; regardless of the driver's steering of the steering wheel, the driving-apparatus-integrated permanent-magnet synchronous motor 1 outputs torque required for steering the vehicle.

As described above, in an electric power steering device configured in such away as to produce auxiliary torque for assisting steering operation by a driver and steering torque at a time when automatic driving is implemented, it is important that neither the auxiliary torque for assisting steering operation by the driver while the vehicle is driven nor the steering torque at a time when automatic driving is implemented is lost.

Therefore, in the driving-apparatus-integrated permanent-magnet synchronous motor 1 that outputs torque and transfers the torque to the electric power steering device 101, it is required, in order to prevent the torque from being suddenly lost upon a failure, that two independent systems give redundancy to a driving apparatus including an inverter, a control circuit for controlling the driving apparatus, and a permanent-magnet synchronous motor, that a failed system is excluded from control and drive of the permanent-magnet synchronous motor, and that a normal system performs driving in such a way that the permanent-magnet synchronous motor is made to continuously output desired torque. When electrically independent from each other, the respective control apparatuses in the two systems are prevented from being affected by a failure in one of the two systems and the respective driving apparatuses in the two systems are prevented from being affected by a failure in one of the two systems; however, it is required that the respective permanent-magnet synchronous motors in the two systems are magnetically as well as electrically separated from each other.

The following is the reason why it is required that in order to make the permanent-magnet synchronous motor in the normal system continuously output torque, the two systems are magnetically as well as electrically separated from each other: in the case where when the two systems are not magnetically separated from each other, the mutual inductance, which is magnetic coupling between the two systems in the permanent-magnet synchronous motor, is large, interlinked magnetic flux generated through rotation of the permanent magnet makes a large current flow through a low-impedance short circuit in the armature winding of one of the two systems even if supply of an electric current to the failed one of the two systems is stopped; the foregoing large current functions as a primary current and the mutual inductance makes a secondary current flow in the armature winding of the other (normal) system; thus, the current in the other (normal) system, which is required for making the permanent-magnet synchronous motor continuously produce torque, is disturbed.

Therefore, in order to securely output torque to be continuously outputted upon a failure, it is required that two systems that are magnetically coupled with each other in a weak manner, i.e., two systems with a small mutual inductance, give redundancy to the permanent-magnet synchronous motor.

As a configuration for obtaining a permanent-magnet synchronous motor in which the magnetic coupling between the two systems is small, a structure is conceivable in which two iron cores corresponding to the respective systems, i.e., two stators, are provided in a single driving-apparatus-integrated permanent-magnet synchronous motor; however, in this case, the permanent-magnet synchronous motor is large-size and heavy and hence the mountability to an electric power steering device and the gasoline mileage of an automobile are deteriorated; thus, it goes without saying that the foregoing permanent-magnet synchronous motor is inappropriate for being mounted in a vehicle.

Figure 2:
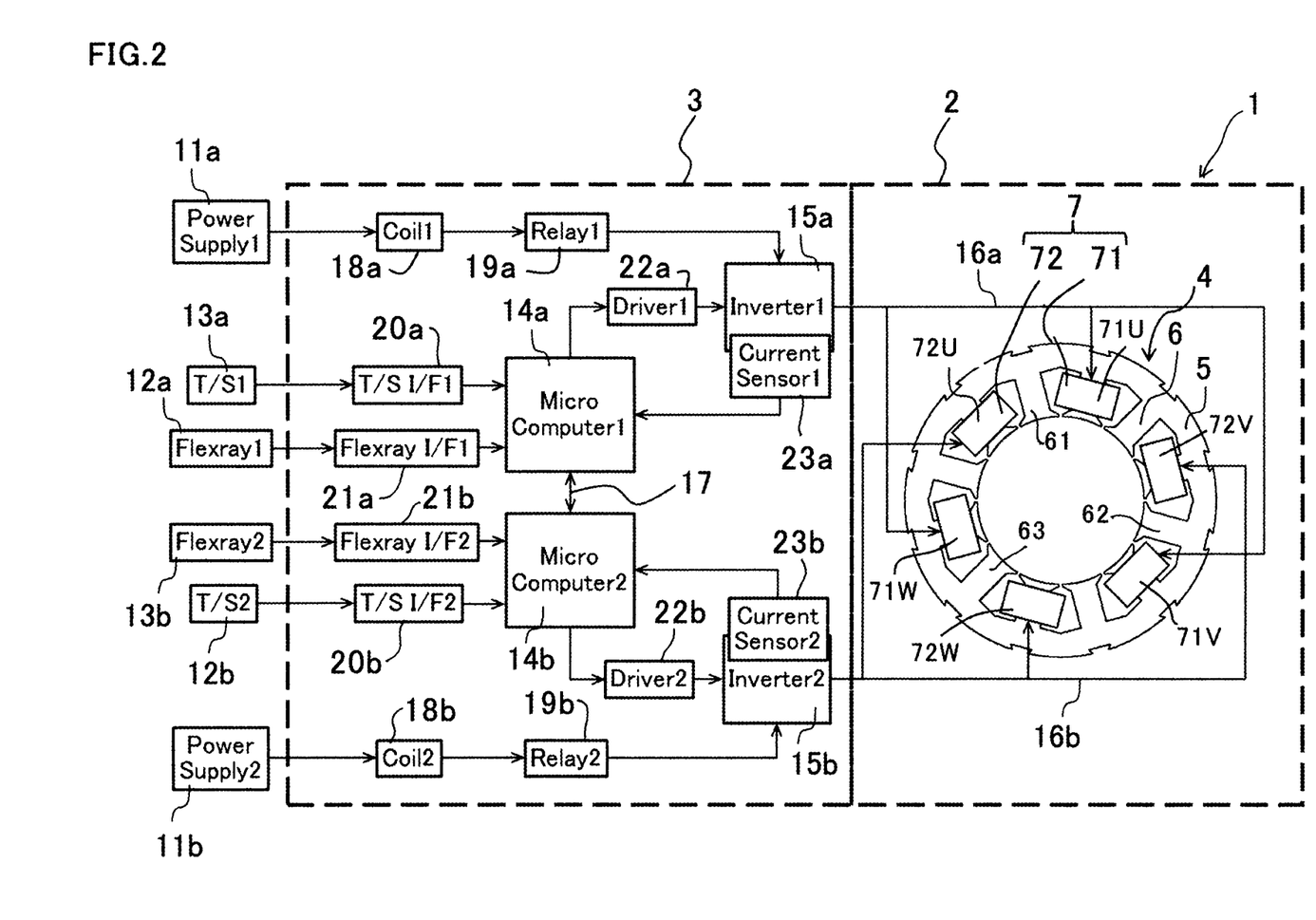
FIG. 2 is a block diagram of a permanent-magnet synchronous motor according to Embodiment 1 of the present invention.

FIG. 2 is a block diagram of a permanent-magnet synchronous motor according to Embodiment 1 of the present invention; the permanent-magnet synchronous motor corresponds to the driving-apparatus-integrated permanent-magnet synchronous motor 1 in the electric power steering device 101 illustrated in FIG. 1. In FIG. 2, a stator 4 in the motor unit 2 of the driving-apparatus-integrated permanent-magnet synchronous motor 1 is provided with a stator iron core 5 configured with magnetic thin plates that are stacked in the axial direction. Twelve teeth 6, as a plurality of teeth, are formed in the inner circumferential portion of the stator iron core 5 in such a way as to be spaced 30° (as a predetermined angle) apart from one another.

An armature winding 7 is wound alternately on the twelve teeth in a concentrated winding manner. The armature winding 7 is configured with two sets of armature windings, i.e., a first armature winding 71 and a second armature winding 72, that are independent from each other and are each in a three-phase delta connection or in a three-phase star connection.

The first armature winding 71 includes a first U-phase armature winding 71U, a first V-phase armature winding 71V, and a first W-phase armature winding 71W; the first U-phase armature winding 71U, the first V-phase armature winding 71V, and the first W-phase armature winding 71W are each wound on every four teeth 6.

The second armature winding 72 includes a second U-phase armature winding 72U, a second V-phase armature winding 72V, and a second W-phase armature winding 72W; the second U-phase armature winding 72U, the second V-phase armature winding 72V, and the second W-phase armature winding 72W are each wound on every four teeth 6.

The first U-phase armature winding 71U and the second U-phase armature winding 72U are wound on the respective teeth, at the both sides of a tooth 61, that flank the tooth 61 on which no winding is wound; the first V-phase armature winding 71V and the second V-phase armature winding 72V are wound on the respective teeth, at the both sides of a tooth 62, that flank the tooth 62 on which no winding is wound; the first W-phase armature winding 71W and the second W-phase armature winding 72W are wound on the respective teeth, at the both sides of a tooth 63, that flank the tooth 63 on which no winding is wound.

The first wiring lead 71 and the second wiring lead 72 are alternately wound on every two teeth. Because in such a manner as described above, the first wiring lead 71 and the second wiring lead 72 are alternately wound on every two teeth, the magnetic coupling between the first wiring lead 71 and the second wiring lead 72 is small and hence the mutual inductance is small; therefore, even if a short-circuit accident occurs in one of the two armature windings and hence a short circuit current flows therein, no adverse effect is provided to the armature current flowing in the other one of the two armature windings.

The control apparatus 3 in the driving-apparatus-integrated permanent-magnet synchronous motor 1 is provided with a first microcomputer 14a, a first inverter 15a, a first filter coil 18a, a first power source relay 19a, a first torque sensor signal interface 20a, a first vehicle signal interface 21a, and a first driving circuit 22a. The first inverter 15a is composed of, for example, a three-phase bridge circuit (unillustrated) provided with a U-phase upper arm and a U-phase lower arm that each have a semiconductor switching device, a V-phase upper arm and a V-phase lower arm that each have a semiconductor switching device, and a W-phase upper arm and a W-phase lower arm that each have a semiconductor switching device.

Through a first power source connecter 11a connected with an electric power source that outputs DC electric power based on the output of a vehicle battery or the like composed of, for example, a secondary battery, DC electric power is supplied to the first inverter 15a by way of the first filter coil 18a and the first power source relay 19a. Through a first torque sensor signal connector 13a, a first steering torque signal produced by a driver of the vehicle is inputted to the first microcomputer 14a by way of the first torque sensor signal interface 20a; in addition, through a first vehicle signal connector 12a, a first vehicle signal such as a vehicle speed is inputted to the first microcomputer 14a by way of the first vehicle signal interface 21a. Furthermore, a first inverter output current signal corresponding to the output current of the first inverter 15a, detected by a first current sensor 23a, is inputted to the first microcomputer 14a.

Based on the inputted foregoing first steering torque signal, first vehicle signal such as a vehicle speed, first inverter output current signal, and the like, the first microcomputer 14a calculates a target output current value for the first inverter 15a and then provides a first command signal based on the result of the calculation to the first driving circuit 22a. Based on the first command signal provided by the first microcomputer 14a, the first driving circuit 22a performs PWM (Pulse Width Modulation)-control of each of the semiconductor switching devices in the first inverter 15a so that the first inverter 15a outputs a three-phase output current that is feedback-controlled so as to keep track of the output target current value.

The three-phase output current from the first inverter 15a is supplied to the first U-phase armature winding 71U, the first V-phase armature winding 71V, and the first W-phase armature winding 71W that are included in the first armature winding of the motor unit 2, so that a first rotating magnetic field is generated in the stator 4. Based on the rotation of the first rotating magnetic field, driving power is provided to the rotor provided with a permanent magnet, as magnetic-field poles, so that the rotor rotates.

The first inverter 15a forms a first driving apparatus; the first microcomputer 14a, the first filter coil 18a, the first power source relay 19a, the first torque sensor signal interface 20a, the first vehicle signal interface 21a, and the first driving circuit 22a form a first control apparatus.

Furthermore, the foregoing first microcomputer 14a, first inverter 15a, filter coil 18a, first power source relay 19a, first torque sensor signal interface 20a, first vehicle signal interface 21a, and first driving circuit 22a and the foregoing first armature winding including the first U-phase armature winding 71U, the first V-phase armature winding 71V, and the first W-phase armature winding 71W form a first system of the permanent-magnet synchronous motor 1.

The control apparatus 3 in the driving-apparatus-integrated permanent-magnet synchronous motor 1 is provided with a second microcomputer 14b, a second inverter 15b, a second filter coil 18b, a second power source relay 19b, a second torque sensor signal interface 20b, a second vehicle signal interface 21b, and a second driving circuit 22b. The second inverter 15b is composed of, for example, a second three-phase bridge circuit (unillustrated) provided with a U-phase upper arm and a U-phase lower arm that each have a semiconductor switching device, a V-phase upper arm and a V-phase lower arm that each have a semiconductor switching device, and a W-phase upper arm and a W-phase lower arm that each have a semiconductor switching device.

Through a second power source connecter 11b connected with an electric power source that outputs DC electric power based on the output of a vehicle battery or the like composed of, for example, a secondary battery, DC electric power is supplied to the second inverter 15b by way of the second filter coil 18b and the second power source relay 19b. Through a second torque sensor signal connector 13b, a second steering torque signal produced by a driver of the vehicle is inputted to the second microcomputer 14b by way of the second torque sensor signal interface 20b; in addition, through a second vehicle signal connector 12b, a second vehicle signal such as a vehicle speed is inputted to the second microcomputer 14b by way of the second vehicle signal interface 21b. Furthermore, a second inverter output current signal corresponding to the output current of the second inverter 15b, detected by a second current sensor 23b, is inputted to the second microcomputer 14b.

Based on the inputted foregoing second steering torque signal, second vehicle signal such as a vehicle speed, second inverter output current signal, and the like, the second microcomputer 14b calculates a target output current value for the second inverter 15b and then provides a second command signal based on the result of the calculation to the second driving circuit 22b. Based on the second command signal provided by the second microcomputer 14b, the second driving circuit 22b performs PWM-control of each of the semiconductor switching devices in the second inverter 15b so that the second inverter 15b outputs a three-phase output current that is feedback-controlled so as to keep track of the output target current value.

The three-phase output current from the second inverter 15b is supplied to the second U-phase armature winding 72U, the second V-phase armature winding 72V, and the second W-phase armature winding 72W that are included in the second armature winding of the motor unit 2, so that a second rotating magnetic field is generated in the stator 4. Based on the rotation of the second rotating magnetic field, driving power is provided to the rotor provided with a permanent magnet, as magnetic-field poles, so that the rotor rotates.

The second inverter 15b forms a second driving apparatus; the second microcomputer 14b, the second filter coil 18b, the second power source relay 19b, the second torque sensor signal interface 20b, the second vehicle signal interface 21b, and the second driving circuit 22b form a second control apparatus.

The foregoing second microcomputer 14b, second inverter 15b, second filter coil 18b, second power source relay 19b, second torque sensor signal interface 20b, second vehicle signal interface 21b, and second driving circuit 22b and the foregoing second armature winding including the second U-phase armature winding 72U, the second V-phase armature winding 72V, and the second W-phase armature winding 72W form a second system of the permanent-magnet synchronous motor 1.

It may be allowed that the first control apparatus and the second control apparatus are configured in such a way that at a normal time when no failure has occurred, the distribution rates of respective amounts of electric currents to be supplied to the first armature winding 71 and the foregoing second armature winding 72 are not equal to each other.

The foregoing first system and second system are each configured in such a way as to collaborate with other vehicle systems for brake control, chassis control, and the like through a vehicle signal so as to control the motor unit 2 of the permanent-magnet synchronous motor 1; in addition, by means of a communication apparatus 17, the first system and the second system are synchronize with each other through a synchronization signal so as to control the motor unit 2.

In this situation, the operation of the driving-apparatus-integrated permanent-magnet synchronous motor 1 at a time when a failure occurs will be explained. For example, as an example, there will be explained the case where a failure such as a short circuit occurs in any one of the second U-phase armature winding 72U, the second V-phase armature winding 72V, and the second W-phase armature winding 72W that are included in the second armature winding of the second system of the driving-apparatus-integrated permanent-magnet synchronous motor 1.

If a failure such as a short circuit occurs in the second armature winding 72, the second microcomputer 14b in the second system detects the failure in the second armature winding 72 and then provides a command to the second driving circuit 22b so as to stop driving of the second inverter 15b, thereby making the three-phase armature current, as a driving current for the second armature winding 72, become "0". This makes the torque that has been produced in the motor unit 2 by the second system become "0" and hence the output torque of the overall motor becomes the torque produced only the first system, i.e., becomes half of the torque at a normal time; however, the function of the electric power steering device is not lost completely and the steering can continuously be performed.

Furthermore, the first U-phase armature winding 71U and the second U-phase armature winding 72U are wound on the respective teeth, at the both sides of the tooth 61, that flank the tooth 61 on which no winding is wound; the first V-phase armature winding 71V and the second V-phase armature winding 72V are wound on the respective teeth, at the both sides of the tooth 62, that flank the tooth 62 on which no winding is wound; the first W-phase armature winding 71W and the second W-phase armature winding 72W are wound on the respective teeth, at the both sides of the tooth 63, that flank the tooth 63 on which no winding is wound; therefore, the magnetic coupling between the first armature winding 71 and the second armature winding 72 is small and hence the mutual inductance becomes small. As a result, even if a short-circuit accident occurs in one of the two armature windings and hence a short circuit current flows therein, no adverse effect is provided to the armature current flowing in the other one of the two armature windings.

When there is performed the control in which driving of the permanent-magnet synchronous motor by the second system is stopped and, at the same time, the driving current produced by the first system is increased so as to be twice as large as the driving current at a normal time, the torque produced by the first system is also doubled; thus, it is also made possible that the extinction of the torque that has been produced by the second system is compensated so that the output torque of the overall motor does not change from the torque at a normal time.

It may be allowed that if one of the two systems fails, the other one thereof performs the foregoing driving with the amount of an electric current that exceeds the maximum current at a normal time when no failure has occurred in the one of the two systems.

Furthermore, in the driving-apparatus-integrated permanent-magnet synchronous motor 1 according to Embodiment 1 of the present invention, as described above, the first U-phase armature winding 71U and the second U-phase armature winding 72U are wound on the respective teeth, at the both sides of a tooth 61, that flank the tooth 61 on which no winding is wound; the first V-phase armature winding 71V and the second V-phase armature winding 72V are wound on the respective teeth, at the both sides of the tooth 62, that flank the tooth 62 on which no winding is wound; the first W-phase armature winding 71W and the second W-phase armature winding 72W are wound on the respective teeth, at the both sides of a tooth 63, that flank the tooth 63 on which no winding is wound. In other words, the first armature winding 71 in the first system and the second armature winding 72 in the second system are alternately wound on the teeth 6.

Accordingly, for example, when due to a failure in the second system, the driving current to be produced by the second system is made to be "0", the heat generated in the stator 4 is decentralized on every four teeth of the first system; therefore, because the temperature of the motor unit 2 does not locally rise, there can be prolonged the time in which after the failure, the electric power steering device can continuously output auxiliary torque, so that the drivers' operation of the steering wheel can be lightened.

Because the electric power steering device, according to Embodiment 1, that is configured in such a manner as described above can maintain its function even if the driving-apparatus-integrated permanent-magnet synchronous motor fails, the safety of the vehicle can be raised.

Embodiment 2

Figure 3:
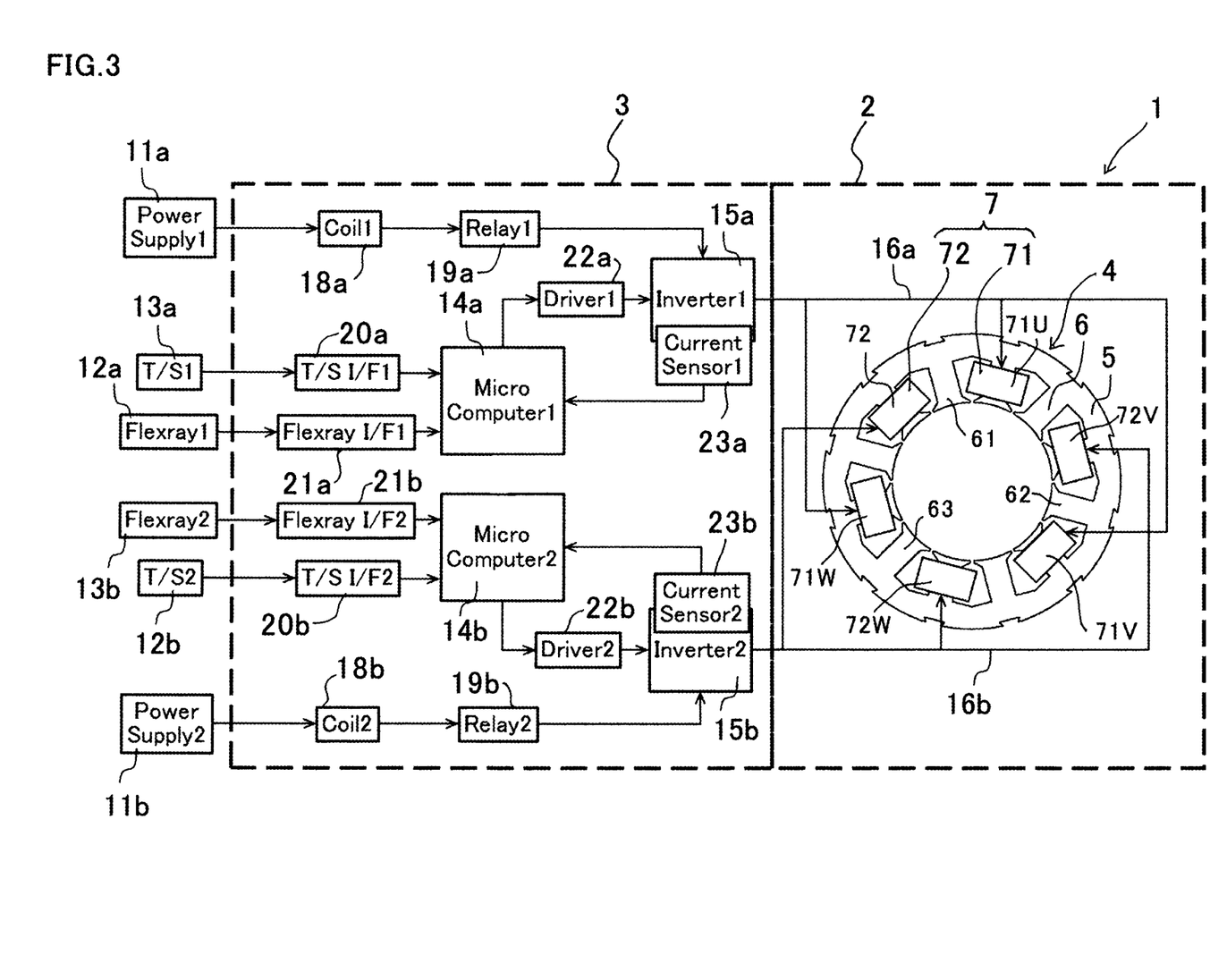
FIG. 3 is a block diagram of a permanent-magnet synchronous motor according to Embodiment 2 of the present invention.

FIG. 3 is a block diagram of a permanent-magnet synchronous motor according to Embodiment 2 of the present invention; the permanent-magnet synchronous motor is utilized as the driving-apparatus-integrated permanent-magnet synchronous motor 1 in the electric power steering device 101 illustrated in FIG. 1. The different point between Embodiments 1 and 2 is that at a normal time, the first microcomputer 14a and the second microcomputer 14b of the control apparatus 3 are not synchronized with each other through a synchronization signal so as to control the motor unit 2. The other configurations are the same as those in Embodiment 1.

As described above, the first U-phase armature winding 71U and the second U-phase armature winding 72U are wound on the respective teeth, at the both sides of the tooth 61, that flank the tooth 61 on which no winding is wound; the first V-phase armature winding 71V and the second V-phase armature winding 72V are wound on the respective teeth, at the both sides of the tooth 62, that flank the tooth 62 on which no winding is wound; the first W-phase armature winding 71W and the second W-phase armature winding 72W are wound on the respective teeth, at the both sides of the tooth 63, that flank the tooth 63 on which no winding is wound; therefore, the magnetic coupling between the first armature winding 71 and the second armature winding 72 is small and hence the mutual inductance becomes small.

Accordingly, while the respective driving currents do not affect each other, each of the first microcomputer 14a in the first control apparatus and the second microcomputer 14b in the second control apparatus obtains a signal from an angle detection apparatus (unillustrated) for detecting the rotation position of the motor unit 2, so that a single common rotor (unillustrated) can independently be driven.

Figure 4:
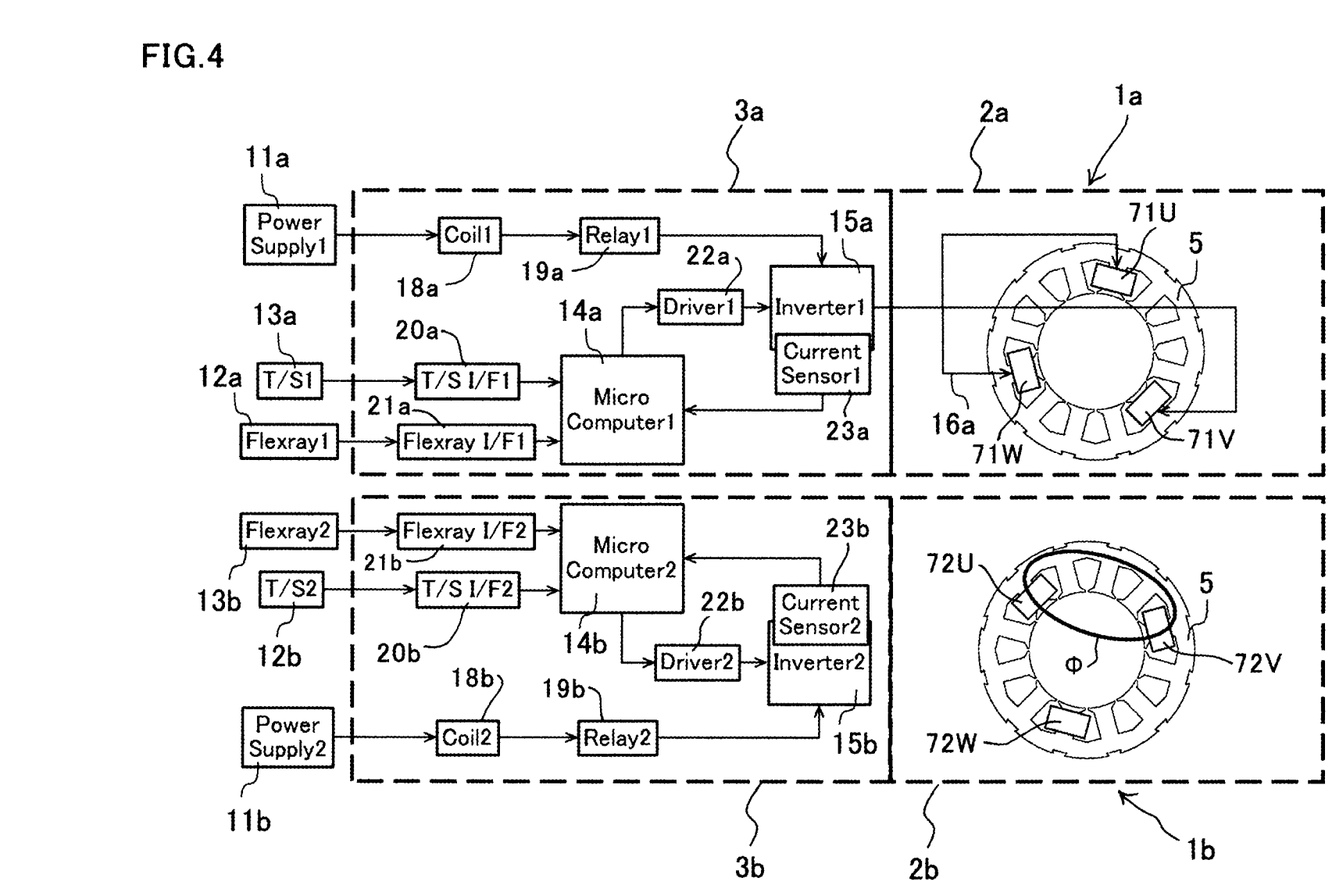
FIG. 4 is an explanatory diagram of the permanent-magnet synchronous motor according to Embodiment 2 of the present invention.

FIG. 4 is an explanatory diagram of the permanent-magnet synchronous motor according to Embodiment 2 of the present invention; FIG. 4 is an explanatory diagram for explaining the operation and the effect at a time when a failure occurs. In FIG. 4, for the convenience of explanation, the driving-apparatus-integrated permanent-magnet synchronous motor is illustrated in such a way as to be schematically separated into a driving-apparatus-integrated permanent-magnet synchronous motor 1a to be controlled by the first system and a driving-apparatus-integrated permanent-magnet synchronous motor 1b to be controlled by the second system; the driving-apparatus-integrated permanent-magnet synchronous motor 1a has a motor unit 2a and a control apparatus 3a; the driving-apparatus-integrated permanent-magnet synchronous motor 1b has a motor unit 2b and a control apparatus 3b. For example, as represented in FIG. 4, if a short-circuit accident occurs between the second U-phase armature winding 72U and the second V-phase armature winding 72V that are included in the armature winding 71 of the second system, a short circuit current flows in the second U-phase armature winding 72U and the second V-phase armature winding 72V; then, magnetic flux Φ based on the short circuit current flows therein. However, the magnetic flux Φ does not substantially pass through the respective teeth on which the first U-phase armature winding 71U, the first V-phase armature winding 71V, and the second W-phase armature winding 72W.

Therefore, even if an accident such as a short circuit occurs in the second armature winding 72 of the second system, no adverse effect is substantially provided to the control of the first armature winding 71 of the normal first system. Similarly, even if an accident such as a short circuit occurs in the first armature winding 71 of the first system, no adverse effect is substantially provided to the control of the second armature winding 72 of the normal second system.

Furthermore, in the driving-apparatus-integrated permanent-magnet synchronous motor according to Embodiment 2 of the present invention, the first microcomputer 14a and the second microcomputer 14b of the control apparatus 3 are not synchronized with each other through a synchronization signal so as to control the motor unit 2; thus, although the stator iron core 5 is common to the first system and the second system, setting the driving current of the failed second system to "0" makes it possible that there is performed operation similar to the operation in which as if two driving-apparatus-integrated permanent-magnet synchronous motors existed, one of the two permanent-magnet synchronous motors fails and the remaining normal driving-apparatus-integrated permanent-magnet synchronous motor outputs torque to the electric power steering device.

As described above, the driving-apparatus-integrated permanent-magnet synchronous motor according to Embodiment 2 of the present invention makes it possible that a single driving-apparatus-integrated permanent-magnet synchronous motor gives redundancy to an electric power steering device, on the mountability and the weight of which restriction is placed; this is a large advantage that does not exist in a conventional driving-apparatus-integrated permanent-magnet synchronous motor.

In addition, for example, when a vehicle is started from a parking state, the vehicle speed is low and the driver largely operates the steering wheel; therefore, the electric power steering device also outputs large auxiliary torque. In this situation, when the steering wheel is turned to the left end or the right end, there occurs a locking state where the current value in the three-phase armature winding of the motor unit is fixed and the heat generation amount in the phase where the current flows most becomes large; thus, in order to suppress the heat generation, it is required to reduce the current amount in the armature winding.

However, in the driving-apparatus-integrated permanent-magnet synchronous motor according to Embodiment 2 of the present invention, when there exists a temperature-rise difference between the respective motor units or the respective control apparatuses of the first system and the second system, the current amount of the system having a higher temperature is decreased and, in contrast, the current amount of the other system is increased, so that it is made possible to perform steering without reducing the auxiliary torque. As described above, the reason why the respective current amounts of the first and second systems can separately be controlled is that the mutual inductance between the first and second systems is small and hence the respective systems can independently be controlled; the effect is large.

In the driving-apparatus-integrated permanent-magnet synchronous motor according to Embodiment 2 of the present invention, as is the case with Embodiment 1, the first U-phase armature winding 71U and the second U-phase armature winding 72U are wound on the respective teeth, at the both sides of the tooth 61, that flank the tooth 61 on which no winding is wound; the first V-phase armature winding 71V and the second V-phase armature winding 72V are wound on the respective teeth, at the both sides of the tooth 62, that flank the tooth 62 on which no winding is wound; the first W-phase armature winding 71W and the second W-phase armature winding 72W are wound on the respective teeth, at the both sides of the tooth 63, that flank the tooth 63 on which no winding is wound. In other words, the first armature winding in the first system and the second armature winding in the second system are alternately wound on the teeth 6.

Accordingly, for example, when due to a failure in the second system, the driving current to be produced by the second system is made to be "0", the heat generated in the stator 4 is decentralized on every four teeth of the first system; therefore, because the temperature of the motor unit 2 does not locally rise, there can be prolonged the time in which after the failure, the electric power steering device can continuously output auxiliary torque, so that the drivers' operation of the steering wheel can be lightened.

Embodiment 3

Figure 5:
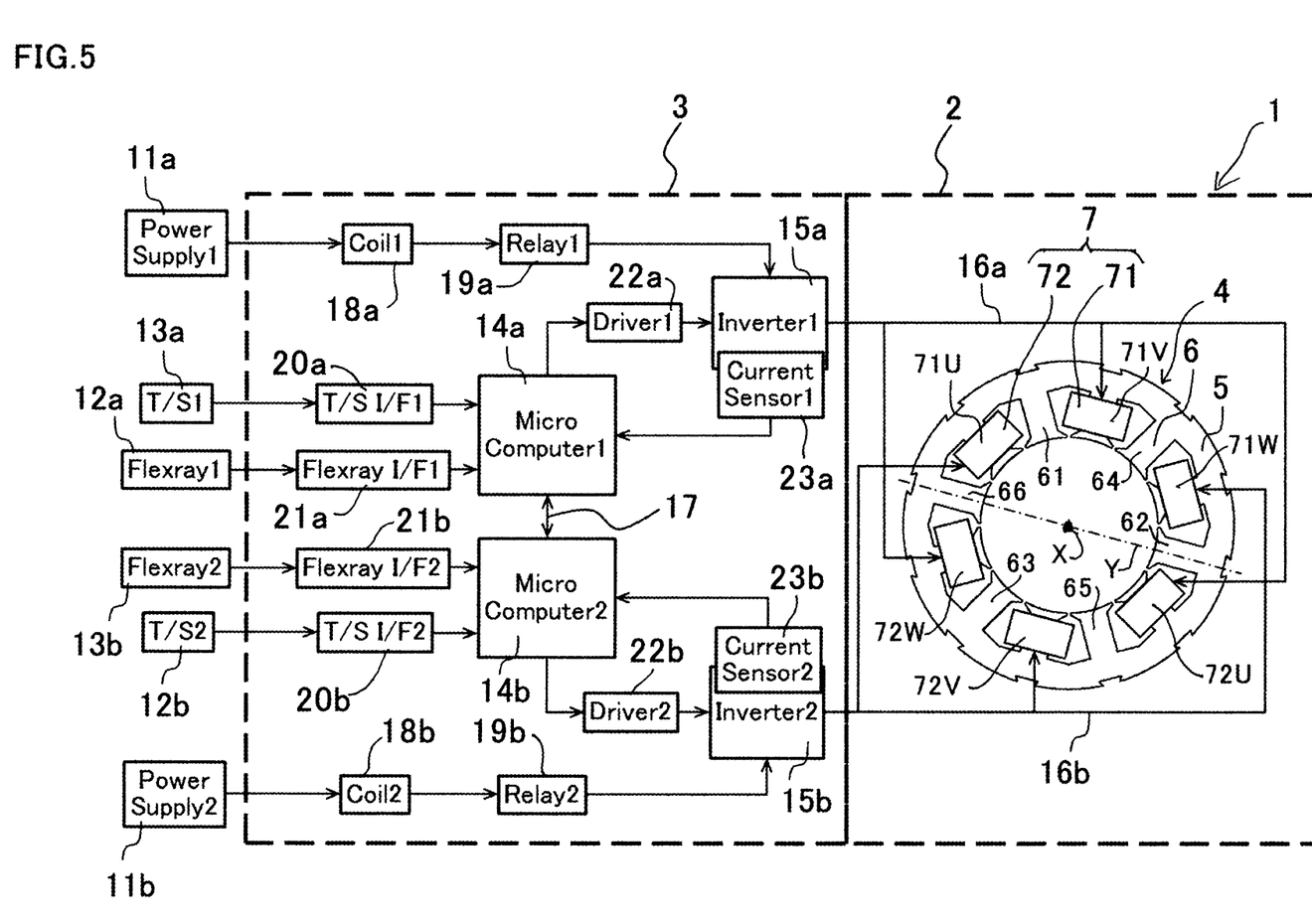
FIG. 5 is a block diagram of a permanent-magnet synchronous motor according to Embodiment 3 of the present invention.

FIG. 5 is a block diagram of a permanent-magnet synchronous motor according to Embodiment 3 of the present invention; the permanent-magnet synchronous motor is utilized as the driving-apparatus-integrated permanent-magnet synchronous motor 1 in the electric power steering device 101 illustrated in FIG. 1. In FIG. 5, the first U-phase armature winding 71U and the first V-phase armature winding 71V are wound on the respective teeth, at the both sides of the tooth 61, that flank the tooth 61 on which no winding is wound; the first V-phase armature winding 71V and the first W-phase armature winding 71W are wound on the respective teeth, at the both sides of the tooth 64, that flank the tooth 64 on which no winding is wound; the first W-phase armature winding 71W and the second U-phase armature winding 72U are wound on the respective teeth, at the both sides of the tooth 62, that flank the tooth 62 on which no winding is wound.

Furthermore, the second U-phase armature winding 72U and the second V-phase armature winding 72V are wound on the respective teeth, at the both sides of the tooth 65, that flank the tooth 65 on which no winding is wound; the second V-phase armature winding 72V and the second W-phase armature winding 72W are wound on the respective teeth, at the both sides of the tooth 63, that flank the tooth 63 on which no winding is wound; the second W-phase armature winding 72W and the first U-phase armature winding 71U are wound on the respective teeth, at the both sides of a tooth 66, that flank the tooth 66 on which no winding is wound.

In other words, in the permanent-magnet synchronous motor according to Embodiment 3 of the present invention, the first armature winding 71 of the first system and the second armature winding 72 of the second system are arranged in such a way as to be linear-symmetric with each other with respect to a radial-direction straight line Y that passes through the center axis X of the stator 4. That is to say, the first U-phase armature winding 71U, the first V-phase armature winding 71V, and the first W-phase armature winding 71W that are included in the first armature winding 71 are arranged in one of the semicircles that are separated by the straight line Y at the cross section, of the stator 4, that is perpendicular to the axial line; the second U-phase armature winding 72U, the second V-phase armature winding 72V, and the second W-phase armature winding 72W that are included in the second armature winding 72 are arranged in the other one of the semicircles that are separated by the straight line Y at the cross section, of the stator 4, that is perpendicular to the axial line. The other configurations are the same as those in Embodiment 1.

In the permanent-magnet synchronous motor, according to Embodiment 3, that is configured in such a manner as described above, in the case where for example, a temperature rise in the first system is large, the driving current for the first system is decreased and the driving current for the second system is increased, so that the temperature distribution in the motor unit 2 is readily equalized; as a result, it is made possible to prolong the time during which at a normal time, the electric power steering device can continuously output auxiliary torque; thus, the drivers' operation of the steering wheel can be lightened.

Moreover, the first armature winding 71 and the second armature winding 72 are separated in half in such a way as to be linear-symmetric with each other with respect to the stator 4; therefore, connection lines 16a of the first system and connection lines 16b of the second system are readily arranged without geometric interference. In particular, in the case of a concentrated winding motor, there is demonstrated a characteristic that because for each of the first inverter 15a and the second inverter 15b, wiring of each of the phases is performed on a single tooth of the corresponding phase, connection becomes simple.

Embodiment 4

Figure 6:
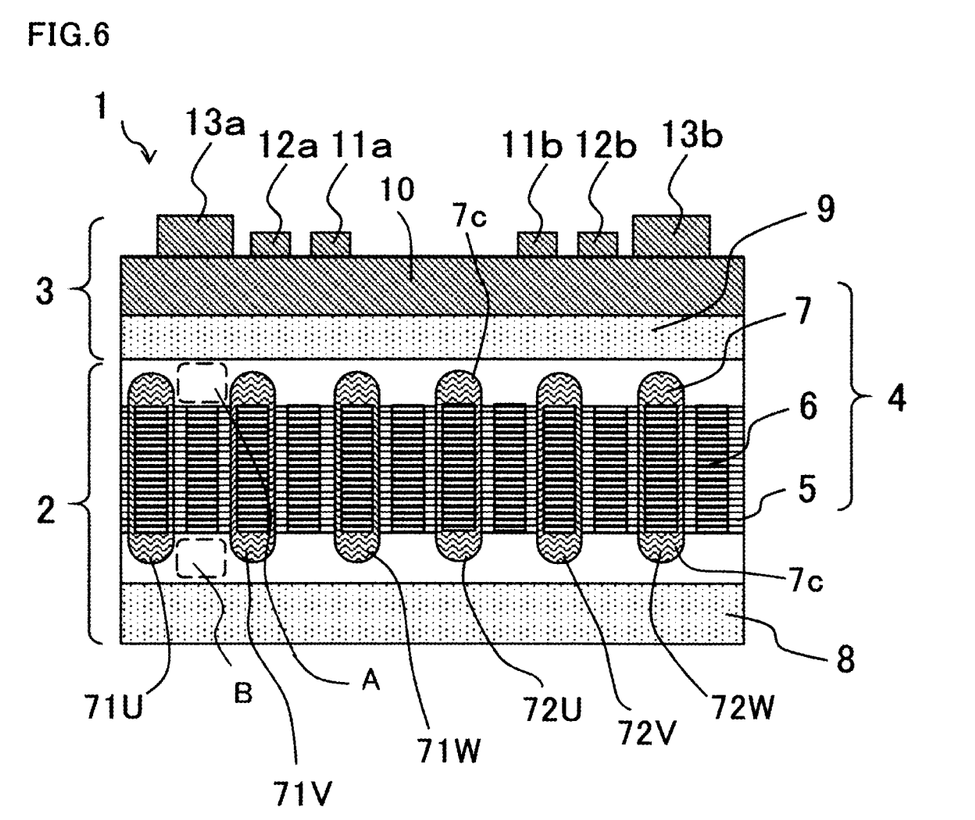
FIG. 6 is a schematic development view of a permanent-magnet synchronous motor according to Embodiment 4 of the present invention.

FIG. 6 is a schematic development view of a permanent-magnet synchronous motor according to Embodiment 4 of the present invention. In FIG. 6, the stator 4 is provided with the stator iron core 5 configured with magnetic thin plates that are stacked in the axial direction, a plurality of teeth 6 formed in the inner circumferential portion of the stator iron core 5, and an armature winding 7 wound on every two teeth 6 in a concentrated manner. The arrangement of the armature winding 7 in Embodiment 4 is the same as that in foregoing Embodiment 3.

That is to say, the armature winding 7 includes the first armature winding 71 and the second armature winding 72; the first armature winding 71 includes the first U-phase armature winding 71U, the first V-phase armature winding 71V, and the first W-phase armature winding 71W that are wound in a concentrated manner on three respective teeth 6 that are arranged in an every-other-tooth manner. The second armature winding 72 includes the second U-phase armature winding 72U, the second V-phase armature winding 72V, and the second W-phase armature winding 72W that are wound in a concentrated manner on three respective teeth 6 that are arranged in an every-other-tooth manner. As is the case with foregoing Embodiment 3 in FIG. 5, the first armature winding is disposed in one of the two semicircle portions of the stator 4, and the second armature winding is disposed in the other one of the two semicircle portions of the stator 4.

Figure 7:
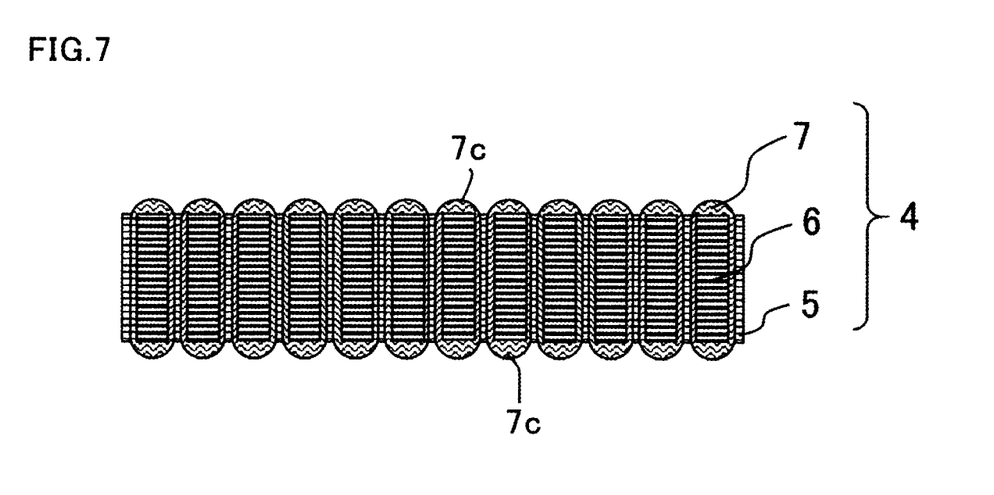
FIG. 7 is a schematic development view of a permanent-magnet synchronous motor as a comparative example.

FIG. 7 is a schematic development view of a permanent-magnet synchronous motor as a comparative example; FIG. 7 illustrates the case where in the stator 4, the armature winding 7 is wound on every teeth 6 of the stator iron core 5. The reason why in the permanent-magnet synchronous motor, illustrated in FIG. 6, according to Embodiment 4 of the present invention, the axial-direction height of each of winding end portions 7c, of the armature winding 7, that protrude in the axial direction from both the respective axial-direction end portions of the stator iron core 5 is relatively larger than the axial-direction height of the winding end portion 7c of the permanent-magnet synchronous motor, as the comparative example, illustrated in FIG. 7 is that in order to make the magnetomotive force in the stator 4 equal to the magnetomotive force in a conventional stator, the number of turns is increased.

In FIG. 6, in the permanent-magnet synchronous motor according to Embodiment 4 of the present invention, the armature winding 7 is wound on every two teeth 6; therefore, respective spaces A and B are formed at both axial-direction sides of the teeth 6 on which no armature winding 7 is wound. The control apparatus 3 is fixed to one of the axial-direction ends of the stator 4, in which the space A is provided; a metal case 8 of the motor is fixed to the other one of the axial-direction ends of the stator 4, in which the space B is provided.

The control apparatus 3 is provided with an aluminum-made heat sink 9 that releases heat generated at least in the inverter, an insulated case 10, the first power source connecter 11a having a resin-made case in the first system, the second power source connecter 11b having a resin-made case in the second system, the first vehicle signal connector 12a having a case in the first system, the second vehicle signal connector 12b having a resin-made case in the second system, the first torque sensor signal connector 13a having a resin-made case in the first system, and the second torque sensor signal connector 13b having a resin-made case in the second system.

The foregoing first power source connecter 11a, second power source connecter 11b, first vehicle signal connector 12a, second vehicle signal connector 12b, first torque sensor signal connector 13a, and second torque sensor signal connector 13b are each fixed to the axial-direction end face of the insulated case 10.

The heat sink 9 is fixed to the stator 4 in such a way as to substantially seal the one of the axial-direction ends of the stator 4; the case 8 of the motor is fixed to the stator 4 in such a way as to substantially seal the other one of the axial-direction ends of the stator 4. The gearbox 102 of the electric power steering device 101 illustrated in FIG. 1 is mounted on the case 8 of the motor.

Figure 8:
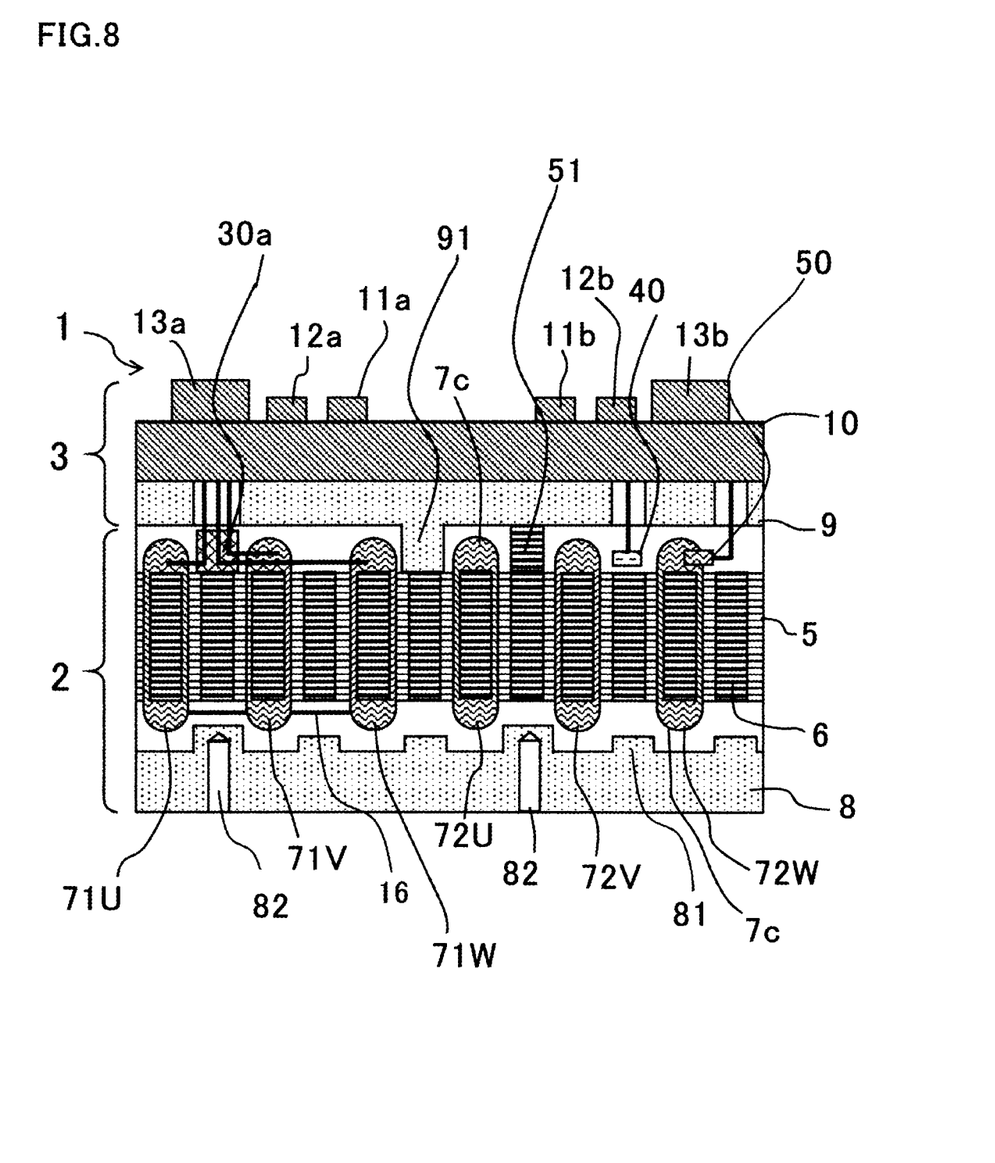
FIG. 8 is a schematic development view of the permanent-magnet synchronous motor according to Embodiment 4 of the present invention.

FIG. 8 is a schematic development view of the permanent-magnet synchronous motor according to Embodiment 4 of the present invention; FIG. 8 more specifically illustrates the permanent-magnet synchronous motor according to Embodiment 4 of the present invention. In FIG. 8, a protruding portion 91 that abuts on the axial-direction endface of a tooth on which no armature winding is wound is provided in the inner endface of the heat sink 9. A tooth on which no armature winding is wound has an iron core 51 that is extended in the axial direction of the stator iron core and then abuts on the inner endface of the heat sink 9. One of the winding end portions 7c of the armature winding 7 is disposed in a space formed between one of the axial-direction ends of the stator iron core 5 and the inner endface of the heat sink 9. The protruding portion 91 and the iron core 51 are parts of the constituent components of the permanent-magnet synchronous motor.

A first terminal 30a for connecting the first armature winding in the armature winding 7 with the first inverter 15a is disposed in the space A illustrated in foregoing FIG. 6. Although a second terminal for connecting the second armature winding in the armature winding 7 with the second inverter 15b is also disposed in a similar manner, the illustration thereof is omitted. A semiconductor magnetic sensor 40 in the angle detection apparatus for detecting the rotation angle of the rotor of the permanent-magnet synchronous motor is disposed in the space between the inner endface of the heat sink 9 and one of the axial-direction ends of a tooth 6 on which no armature winding is wound. A temperature sensor 50 for detecting the temperature of the permanent-magnet synchronous motor is provided in such a way as to abut on an insulator surrounding the armature winding 7. The first terminal 30a, the second terminal, the semiconductor magnetic sensor 40, and the temperature sensor 50 are parts of the constituent components of the permanent-magnet synchronous motor.

The foregoing first terminal 30a and second terminal are connected with the first power source connecter 11a and the second power source connecter 11b, respectively, that are provided in the insulated case 10 of the control apparatus 3, by means of conductors that penetrate respective through-holes provided in the heat sink 9. The semiconductor magnetic sensor 40 and the temperature sensor 50 are connected with the first microcomputer 14a (unillustrated) and the second microcomputer 14b (unillustrated), respectively, of the control apparatus 3, by means of conductors that penetrate respective through-holes provided in the heat sink 9.

In the inner wall surface of the metal-made motor case 8 fixed to the other axial-direction end of the stator 4, a plurality of ribs 81 for raising the rigidity of the motor case 8 and a plurality of screw holes 82 for the connection with the gearbox 102 of the electric power steering device 101 are provided in such a way as to correspond to the foregoing spaces B existing at the other axial-direction ends of the respective teeth 6 on each of which no armature winding is wound. The case 8 in which the screw holes 82 are provided is part of the constituent components of the permanent-magnet synchronous motor.

As described above, the permanent-magnet synchronous motor according to Embodiment 4 of the present invention is configured in the foregoing manner; thus, the constituent components that have been arranged above or below the stator in a conventional permanent-magnet motor can be arranged inside the contour that is in the axial direction of the stator and the same as that of the stator; as a result, the contour size and the axial-direction length of the driving-apparatus-integrated permanent-magnet synchronous motor can be reduced. Therefore, there can be realized a high-mountability driving-apparatus-integrated permanent-magnet synchronous motor that has no significant geometric interference with a vehicle and an electric power steering device.

Moreover, for example, not only the protruding portion 91 of the aluminum-made heat sink 9 that releases heat generated in the inverter of the control apparatus but also the iron core 51 included in the protruding portion of the stator iron core 5 are arranged in the space A illustrated in foregoing FIG. 6, so that heat generated in the armature winding 7 and the heat in the heat sink 9 are readily released to the stator iron core 5 and hence the time during which the steering operation can continuously be performed can be prolonged.

With regard to the permanent-magnet synchronous motor according to any one of foregoing Embodiments 1 through 4 of the present invention, the case where a three-phase armature winding is provided has been described; however, it may be allowed that a multi-phase armature winding other than a three-phase armature winding is provided. In addition, the case where the stator has twelve teeth has been described; however, the number of teeth is not limited to twelve.

The present invention is not limited to the permanent-magnet synchronous motor and the electric power steering device according to any one of Embodiments 1 through 4; in the scope within the spirits of the present invention, the configurations of Embodiments 1 through 4 can appropriately be combined with one another, can partially be modified, or can partially be omitted.

INDUSTRIAL APPLICABILITY

A permanent-magnet synchronous motor and an electric power steering device according to the present invention can be utilized at least in the field of a vehicle such as an automobile.

DESCRIPTION OF REFERENCE NUMERALS

1, 1*a*, 1*b*: driving-apparatus-integrated permanent-magnet synchronous motor
2, 2*a*, 2*b*: motor unit
3, 3*a*, 3*b*: control apparatus
4: stator
5: stator iron core
51: iron core included in protruding portion
6, 61, 62, 63, 64: tooth (teeth)
7: armature winding
71U: first U-phase armature winding
71V: first V-phase armature winding
71W: first W-phase armature winding
72U: second U-phase armature winding
72V: second V-phase armature winding
72W: second W-phase armature winding
8: case
81: rib
82: screw hole
9: heat sink
91: protruding portion
10: insulated case
11, 11*a*, 11*b*: power source connecter
12: vehicle signal connector
12*a*: first vehicle signal connector
12*b*: second vehicle signal connector
13: torque sensor signal connector
13*a*: first torque sensor signal connector
13*b*: second vehicle signal connector
14*a*: first microcomputer
14*b*: second microcomputer
15*a*: first inverter
15*b*: second inverter
16*a*: connection of first system
16*b*: connection of second system
17: communication apparatus
18*a*: first filter coil
18*b*: second filter coil
19*a*: first power source relay
19*b*: second power source relay
20*a*: first torque sensor signal interface
20*b*: second torque sensor signal interface
21*a*: first vehicle signal interface
21*b*: second vehicle signal interface
22*a*: first driving circuit
22*b*: second driving circuit
23*a*: first current sensor
23*b*: second current sensor
101: electric power steering device
102: gearbox
103: housing
104: tie rod
105: shaft
106: torque sensor
107: cable

The invention claimed is:

1. A permanent-magnet synchronous motor comprising:
a stator iron core having a plurality of teeth in an inner circumferential portion thereof and a space surrounded by the inner circumferential portion;
an armature winding wound on every second tooth among the plurality of teeth; and
a rotor that is inserted into the space of the stator iron core and has magnetic-field poles that are each composed of a permanent magnet,
wherein the armature winding is separated into a first armature winding and a second armature winding that are independent from each other,
wherein the first armature winding is connected with a first control apparatus,
wherein the second armature winding is connected with a second control apparatus,
wherein driving can be performed by a first system including the first armature winding and the first control apparatus and a second system including the second armature winding and the second control apparatus,
wherein if a failure occurs in one of the first system and the second system, the driving by the one thereof is stopped and the driving is continued by the other one thereof,
wherein if the one of the two systems fails, the other one thereof performs the driving with the amount of an electric current that exceeds a maximum current at a normal time when no failure has occurred in the one thereof,
wherein at least one of constituent components of the permanent-magnet synchronous motor is arranged in such a way as to correspond to at least one of the axial-direction end portions of a tooth on which the armature winding is not wound, and
wherein the at least one of the constituent components includes at least one of a first terminal for connecting the first control apparatus with the first armature winding and a second terminal for connecting the second control apparatus with the second armature winding.

2. The permanent-magnet synchronous motor according to claim 1, wherein in a normal time when the failure has not occurred, the first control apparatus and the second control apparatus operate in synchronization with each other.

3. The permanent-magnet synchronous motor according to claim 1, wherein in a normal time when the failure has not occurred, the first control apparatus and the second control apparatus independently operate without synchronizing with each other.

4. The permanent-magnet synchronous motor according to claim 1, wherein at a normal time when the failure has not occurred, the first control apparatus and the second control apparatus are configured in such a way that the distribution rates of respective amounts of electric currents to be supplied to the first armature winding and the second armature winding are not equal to each other.

5. The permanent-magnet synchronous motor according to claim 1, wherein the first armature winding and the second armature wiring are alternately wound on every second tooth.

6. The permanent-magnet synchronous motor according to claim 1,
wherein the first armature winding is wound, as a first winding block, on the teeth,
wherein the second armature winding is wound, as a second winding block, on the teeth, and
wherein the first winding block and the second winding block are arranged in such a way as to be symmetric with each other with respect to the stator iron core.

7. The permanent-magnet synchronous motor according to claim 1, wherein the at least one of the constituent components is an iron core that is extended in the axial direction of the stator iron core from a tooth on which the armature winding is not wound.

8. The permanent-magnet synchronous motor according to claim 1, wherein the at least one of the constituent components is a mounting portion for fixing the permanent-magnet synchronous motor to another constituent member.

9. The permanent-magnet synchronous motor according to claim 1, wherein the at least one of the constituent components is a magnetic sensor in an angle detection apparatus for detecting a rotation angle of the rotor.

10. The permanent-magnet synchronous motor according to claim 1 further including a temperature sensor for detecting a temperature of the permanent-magnet synchronous motor.

11. An electric power steering apparatus including the permanent-magnet synchronous motor according to claim 1, wherein torque produced by the permanent-magnet synchronous motor is involved in steering of a vehicle.

12. An electric power steering apparatus including the permanent-magnet synchronous motor according to claim 1, wherein torque produced by the permanent-magnet synchronous motor is involved in steering of a vehicle.

13. An electric power steering apparatus including the permanent-magnet synchronous motor according to claim 5, wherein torque produced by the permanent-magnet synchronous motor is involved in steering of a vehicle.

14. An electric power steering apparatus including the permanent-magnet synchronous motor according to claim 6, wherein torque produced by the permanent-magnet synchronous motor is involved in steering of a vehicle.

15. An electric power steering apparatus including the permanent-magnet synchronous motor according to claim 1, wherein torque produced by the permanent-magnet synchronous motor is involved in steering of a vehicle.

16. A permanent-magnet synchronous motor comprising:
a stator iron core having a plurality of teeth in an inner circumferential portion thereof and a space surrounded by the inner circumferential portion;
an armature winding wound on every second tooth among the plurality of teeth;
a rotor that is inserted into the space of the stator iron core and has magnetic-field poles that are each composed of a permanent magnet;
a heat sink for cooling the first control apparatus and the second control apparatus,
wherein the armature winding is separated into a first armature winding and a second armature winding that are independent from each other,
wherein the first armature winding is connected with a first control apparatus,
wherein the second armature winding is connected with a second control apparatus,
wherein driving can be performed by a first system including the first armature winding and the first control apparatus and a second system including the second armature winding and the second control apparatus,
wherein if a failure occurs in one of the first system and the second system, the driving by the one thereof is stopped and the driving is continued by the other one thereof,
wherein if the one of the two systems fails, the other one thereof performs the driving with the amount of an electric current that exceeds a maximum current at a normal time when no failure has occurred in the one thereof,
wherein at least one of constituent components of the permanent-magnet synchronous motor is arranged in such a way as to correspond to at least one of the axial-direction end portions of a tooth on which the armature winding is not wound, and
wherein the at least one of the constituent components is a protruding portion provided in the heat sink.

17. A permanent-magnet synchronous motor comprising:
a stator iron core having a plurality of teeth in an inner circumferential portion thereof and a space surrounded by the inner circumferential portion;
an armature winding wound on every second tooth among the plurality of teeth; and
a rotor that is inserted into the space of the stator iron core and has magnetic-field poles that are each composed of a permanent magnet,
wherein the armature winding is separated into a first armature winding and a second armature winding that are independent from each other,
wherein the first armature winding is connected with a first control apparatus,
wherein the second armature winding is connected with a second control apparatus,
wherein driving can be performed by a first system including the first armature winding and the first control apparatus and a second system including the second armature winding and the second control apparatus,
wherein if a failure occurs in one of the first system and the second system, the driving by the one thereof is stopped and the driving is continued by the other one thereof, and
wherein in a normal time when the failure has not occurred, the first control apparatus and the second control apparatus operate in synchronization with each other,
wherein at least one of constituent components of the permanent-magnet synchronous motor is arranged in such a way as to correspond to at least one of the axial-direction end portions of a tooth on which the armature winding is not wound, and wherein the at least one of the constituent components includes at least one of a first terminal for connecting the first control apparatus with the first armature winding and a second terminal for connecting the second control apparatus with the second armature winding.

* * * * *